(12) United States Patent
Desroches et al.

(10) Patent No.: US 10,690,545 B2
(45) Date of Patent: Jun. 23, 2020

(54) HYBRID IMAGE-PUPIL OPTICAL REFORMATTER

(71) Applicant: TORNADO SPECTRAL SYSTEMS INC., Toronto (CA)

(72) Inventors: Brandon Joseph Desroches, Brantford (CA); Bradford Bartholomew Behr, Silver Spring, MD (US); Jeffrey Thomas Meade, Yellowknife (CA); Yusuf Bismilla, Toronto (CA); Andrew T. Cenko, Flagstaff, AZ (US)

(73) Assignee: TORNADO SPECTRAL SYSTEMS INC., Toronto, ON (CA)

( * ) Notice: Subject to any disclaimer, the term of this patent is extended or adjusted under 35 U.S.C. 154(b) by 0 days.

(21) Appl. No.: 16/364,786

(22) Filed: Mar. 26, 2019

(65) Prior Publication Data

US 2019/0219444 A1     Jul. 18, 2019

Related U.S. Application Data

(62) Division of application No. 15/003,152, filed on Jan. 21, 2016, now Pat. No. 10,281,325.

(60) Provisional application No. 62/105,928, filed on Jan. 21, 2015.

(51) Int. Cl.
    *G01J 3/02*     (2006.01)
    *G02B 27/30*    (2006.01)
(52) U.S. Cl.
    CPC .............. *G01J 3/024* (2013.01); *G01J 3/021* (2013.01); *G01J 3/0208* (2013.01); *G02B 27/30* (2013.01)

(58) Field of Classification Search
    CPC .......... G01J 3/024; G01J 3/0208; G01J 3/021; G02B 27/30
    USPC ................................. 359/641, 618, 629, 636
    See application file for complete search history.

(56) References Cited

U.S. PATENT DOCUMENTS

| | | | |
|---|---|---|---|
| 3,510,203 A | 5/1970 | Richardson | |
| 5,636,066 A * | 6/1997 | Takahashi | G02B 17/08 359/629 |
| 8,917,390 B2 * | 12/2014 | Behr | G01J 3/28 356/326 |
| 2012/0327409 A1 | 12/2012 | Behr et al. | |
| 2013/0176565 A1 | 7/2013 | Meade et al. | |

* cited by examiner

*Primary Examiner* — Collin X Beatty

(57) ABSTRACT

A hybrid image-pupil optical reformatter and method for optional use with a spectrometer is disclosed, which performs beam slicing in pupil space and stacks replicas of the input source generated from the pupil beam slices in image space. The optical reformatter comprises a collimator which receives an input light and produces a collimated beam; a first optical element which receives the collimated beam, redirects portions of the collimated beam back toward the collimator as reimaged beams and permits portions of the collimated beam to pass; a second optical element which receives the reimaging beams and redirects the reimaging beams back toward the collimator and the first optical element; to form an output beam comprising the portions of the collimated beams that are not redirected toward the collimator by the first optical element. Also disclosed is the use of the reformatter for reformatting the input light of a spectrometer system, and the use of the reformatter as part of a spectrometer device.

8 Claims, 4 Drawing Sheets

HYBRID IMAGE-PUPIL OPTICAL REFORMATTER

RELATED APPLICATION

This application claims priority from U.S. Provisional Application No. 62/105,928 filed Jan. 21, 2015, the content of which is herein incorporated by reference.

FIELD OF THE INVENTION

This invention relates to the field of optical reformatters and more specifically relates to improved reformatter apparatus and methods for improving the performance of an optical system, such as improving the spectral resolution of an optical spectrometer.

BACKGROUND

Optical reformatters tend to be implemented for receiving input images and light beams and producing reshaped output images and light beams which are better suited for measurement by an optical system such as an optical spectrograph or a detector or detector array, or for further processing by a light processing system. Specifically, optical reformatters are useful for preparing and configuring light that passes to an optical spectrograph from the output of a light source such as an optical fiber, a bundle of optical fibers, a telescope, an image relay, or a physical aperture such as an input slit.

By way of background, conventional optical spectrographs include a small input aperture, typically a slit. The input aperture could alternatively be a circular pinhole, an optical fiber, or other input means; however, for the sake of brevity, the input aperture will hereinafter be referred to as a slit. An input light may be a converging or diverging beam of light projected towards the slit, or may be some other light source placed such that a portion of the light passes through the slit. In a typical optical spectrograph, light passing through the slit is projected onto a lens or mirror which collimates the light to form a beam of substantially parallel light rays. In a typical optical spectrograph, a dispersive element, such as, a prism, a transmission grating, or reflection grating, bends the collimated beams by differing amounts, depending on the wavelength of the light, thereby producing a spectrally dispersed light beam. Often, a camera lens or mirror brings these spectrally dispersed beams into focus on an array detector, such as a charge-coupled device (CCD) detector, or some other single element or multi-element detector located at the final focal plane, and which may measure the focused spectrum and record the light intensities of the various wavelengths.

In a typical optical spectrograph, the collimating lens (or mirror) and the camera lens (or mirror) act as an image relay, to create images of the light passing through the slit on the detector, such as a CCD detector, with the images displaced laterally depending on the wavelength of the light. The spectral resolution of an optical spectrograph, a quantitative description of its ability to detect and measure narrow spectral features such as absorption or emission lines, can be dependent upon various characteristics of the spectrograph. Such characteristics may include the dispersing element, for example the prism, transmission grating, or reflection grating; the focal lengths of the collimating lens (or mirror) and camera lens (or mirror); and the width of the slit along the dispersive axis. For a particular disperser and camera lens, the resolution of the spectrograph can be increased by narrowing the width of the input slit, which causes each image of the light passing through the slit (depending on the wavelength of the light) and onto a detector, to subtend a smaller section of the detector, allowing adjacent spectral elements to be more easily distinguished from each other.

By narrowing the width of the input slit, less light passes therethrough, which can reduce the quality of any measurements due to a reduction in the signal-to-noise ratio. In some applications, such as astronomical spectroscopy, high-speed biomedical spectroscopy, high-resolution spectroscopy, or Raman spectroscopy, this loss of efficiency can be a limiting factor in the performance of the optical spectrograph. A device which increases the amount of light that can pass through the slit by compressing an image of an input beam of light along the dispersive axis (i.e. horizontally), while substantially maintaining light intensity or flux density, would be advantageous in the field of optical spectrography even if the spot image is compressed along the dispersive axis at the expense of expansion along a perpendicular axis (i.e. vertically).

A person of skill will understand that the terms "horizontal", "vertical" and other such terms used throughout this description, such as, "above" and "below", are used for the sake of explaining various embodiments of the invention, and that such terms are not intended to be limiting of the present invention.

A person of skill will also understand that while the term component is usually used to refer to a specific item such as a lens or a mirror, and the term element is usually used to refer to a group of components that share a common functional purpose, it is also possible to have an element made up of a single component, or a single component which functions as multiple elements. For example, in the case of an optical component with multiple reflective or refractive surfaces such as a lens with a reflective coating, the lens could have the function of one element and the reflective coating could have the function of a different element. Similarly, a curved mirror could both redirect a light beam and change the divergence of the light beam, thereby providing the function of multiple elements in the same component.

A person of skill will also understand that the focused image produced by focusing a collimated beam may be referred to as a spot or a spot image, and that a light source does not need to be a focused spot image in order to be collimated. An image refers to the light field spatial distribution at the focal plane of a lens or mirror wherein the wavefront concavity changes direction, while image-space refers to any space in the light field where the wavefronts are substantially not planar. A pupil refers to a lateral cross section of a light field wherein the wavefronts are substantially planar, and pupil-space therefore refers to any location where the wavefronts are substantially planar.

Optical reformatters can be useful to receive an input beam and/or input image and produce output beams and/or output images that are better matched to spectrometer input slits. An optical slicer is one type of optical reformatter in which portions of the beam or image are divided up and redirected or repositioned.

An optical slicer comprising transparent prisms and plates to slice an input beam can have deficiencies because it may produce a reformatted image at a slit that is tilted along the optical axis, and additionally the slicing of an optical beam can occur along the hypotenuse of a 45° prism, which can result in focal point degradation due to different sections of the sliced image being located at different focal positions. The performance of such slicers can also depend on the absorption coefficient and index of refraction of the prism material used (which are both wavelength dependent). These deficiencies can limit the use of such slicers in broadband optical devices.

There also exists other optical slicers which are image slicers, such as the Bowen-Walraven slicer or optical fiber spot-to-line converters, which operate entirely in the image space. Some such image slicers generally do not preserve the spatial image information and are therefore unable to resolve spectral information from different portions of a source image independently. These reformatters are also challenging to implement in a commercially feasible way, can be large in size, and can result in reduced or inefficient implementation of a variety of systems. These slicers often produce multiple copies of the slit image which can result in wasted space on the detector due to gaps between the slices at the final focal plane, which may add noise to the signal and thus decrease the quality of the output data, limit the number of spectra (or spectral orders) that can fit on the detector, and reduce the efficiency of the detector readout because of the spectrum being spread over a larger detector area. Optical slicers using optical fiber bundles to allow the extended (often round) image of an input source to be formed into a narrow slit image can also cause degradation of the output f-ratio and the total performance to be inefficient. Existing slicer devices almost uniformly suffer this decreased efficiency and output f-ratio, which is a clear limitation of slicer design and implementation. Also, optical fiber bundles tend to be inefficient for light collection due to gaps between the individual fibers and space taken up by the individual fiber claddings.

More recently, new pupil reformatter designs, and the use of pupil reformatters to improve the spectral resolution of a spectrograph, have been disclosed. These slicer-based reformatters operate entirely in pupil space, slicing and then anamorphically expanding a collimated beam. This approach is useful when spatial image information needs to be preserved, such as with push-broom hyperspectral imaging, multi-fiber inputs, etc., but pupil beam divergence can be problematic with larger input sources, and optical system complexity increases with an increase in the number of slices created.

The present invention differs from existing reformatter designs in that it operates partially in pupil space and partially in image space. As such, it is referred to throughout this application as a hybrid image-pupil optical reformatter and embodiments of the present invention can be described as a hybrid slicer or hybrid reformatter, which operates partially in pupil space and partially in image space. This approach has advantages over traditional optical slicers including in instances when a larger number of slices are desired since operating a reformatter partially in pupil space and partially in image space, as disclosed in this invention, tends to be characterized by back-and-forth optical beam paths through a collimator which limits the beam from spreading out. In embodiments of the present invention, larger slicing factors may be achieved with fewer components, reduced beam divergence losses, and less demanding alignment tolerances, and the number of slices tends to be relatively independent of the optical complexity, with a preferred number of slices being approximately equal to the ratio of the input beam width to the output beam width. Embodiments of the present design also tend to more easily handle larger input spot sizes and/or faster input beams (small f-ratios) than traditional optical slicers.

The pupil beam in the present invention tends to get narrower without getting taller, and the pupil slices disclosed in embodiments of the present invention tend to overlap. This is in contrast to most pupil reformatters in which the pupil beam gets both narrower and taller, and the pupil slices generally do not overlap. Further, many other optical reformatters use 'explicit' expansion as part of the reformatting while the expansion is 'implicit' in some embodiments disclosed in the present invention.

SUMMARY OF THE INVENTION

In an aspect of the present invention there is provided an optical reformatter for generating an output beam comprising a collimator which receives an input light and produces a first collimated beam; a first optical element which redirects one or more portions of the first collimated beam toward the collimator to produce one or more reimaging beams and which allows one or more portions of the first collimated beam to pass the first optical element to form part of the output beam; and a second optical element which redirects some or all of the reimaging beams toward the collimator to produce additional collimated beams, such that portions of the additional collimated beams also form parts of the output beam.

In some embodiments of the present invention, the one or more portions of the first collimated beam that form part of the output beam may pass the first optical element without any further redirection. In other embodiments, the input light may be the output of an optical fiber, an image relay, or a physical aperture.

The collimator may be singlet lens, complex lens, single mirror, or other optical element which collimates a diverging beam and focuses a collimated beam. Further, the first collimated beam and additional collimated beams may be substantially or perfectly collimated. Still further, the first optical element and the second optical element may each comprise one or more mirrors.

In some embodiments, the one or more portions of the first collimated beam redirected toward the collimator may be located at the extremities of the first collimated beam. In other embodiments, the one or more portions of the first collimated beam redirected toward the collimator may be redirected non-parallel to the first collimated beam; or the one or more portions of the first collimated beam redirected toward the collimator may be redirected non-parallel to one another.

The reimaging beams may produce focused images at positions non-incident to the input light, and the second optical element may be positioned to redirect the one or more reimaging beams without blocking the path between the input light and the collimator. The second optical element may also be positioned at the location where the reimaging beams produce focused images.

In further embodiments, the one or more portions of the additional collimated beams may be redirected toward the collimator by the first optical element, to produce additional reimaging beams; and the additional reimaging beams may be redirected toward the collimator by the second optical element, to produce further additional collimated beams, such that one or more portions of the further additional collimated beams also pass the first optical element to form part of the output beam. In still further embodiments, such redirection of the additional collimated beams and additional reimaging beams may be iterative and repetitive in nature.

In some embodiments, substantially all of the light energy received from the input light may be contained in the output beam. Additionally, the portions of the first collimated beam and additional collimated beams which form the output beam may be substantially overlapping and propagating in substantially the same direction. The output beam may also be narrower in dimension than the first collimated beam.

The optical reformatter may also comprise an additional optical element to redirect the output beam after it passes by the first optical element. Alternatively, or in the addition, the optical reformatter may also comprise a focusing element to focus the output beam onto an input of a spectrometer. In some embodiments, the focusing element may be a rod lens, a cylindrical lens, a cylindrical mirror, or one or more cylindrical or toroidal lenses or mirrors.

In a further aspect of the present invention, the optical reformatter may also an optical element to expand the output beam along a first dimension to produce an expanded beam; a dispersive element to spectrally disperse the expanded beam along the first dimension to produce a spectrally dispersed beam; a focusing element to focus the spectrally dispersed beam to produce a focused spectrum; and a detector to receive and measure the focused spectrum.

In a still further aspect of the present invention, there is provided a method of generating an output beam comprising collimating an input light through a collimator to produce a first collimated beam; redirecting one or more portions of the first collimated beam back through the collimator to produce one or more reimaging beams; redirecting some or all of the reimaging beams through the collimator to produce additional collimated beams; and forming an output beam from the additional collimated beams and portions of the first collimated beams which are not redirected back through the collimator.

In some embodiments, the portions of the additional collimated beams may also be redirected back through the collimator to produce additional reimaging beams, and some or all of the additional reimaging beams may be redirected through the collimator to produce further collimated beams, such that output beam may include portions of the further additional collimated beams. In further embodiments, the redirection is iterative.

The redirected beams and beam portions may be redirected to produce an output beam formed from substantially overlapping beams and beam portions, propagating in substantially the same direction, and with substantially all of the light energy in the input light. The redirected beams and beam portions may also be redirected to produce an output beam that is narrower in a first dimension relative to the first collimated beam. In some embodiments, the method may also comprise focusing the output beam onto the input of a spectrometer. In some embodiments, the output beam may be expanded along a first dimension to produce an expanded beam; the expanded beam may be spectrally dispersed along the first dimension to produce a spectrally dispersed beam; the dispersed beam may be focused to produce a focused spectrum, and the focused beam may be measured.

BRIEF DESCRIPTION OF FIGURES

For a better understanding of embodiments of the system and methods described herein, and to show more clearly how they may be carried into effect, reference will be made by way of example, to the accompanying drawings in which.

DESCRIPTION

It will be appreciated that, numerous specific details have provided for a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered so that it may limit the scope of the embodiments described herein in any way, but rather as merely describing the implementation of the various embodiments described herein.

In the descriptions and figures below, references to "top", "bottom", "left", "right", "horizontal", "vertical" etc. are used for convenience and clarity only. They are in no way meant to limit the possible orientations of the various optical components and structures, rather they are used to describe and illustrate the relative orientations of certain elements within the design disclosed in the present application. The use of the term "collimated" in this application shall include both perfectly collimated and substantially collimated.

In the descriptions and figures below, optical elements such as mirrors and lenses are used to illustrate the invention. It may be possible to achieve the same result using different optical elements, or by using a design in which reflections are replaced with transmissions, or transmission are replaced with reflections, to achieve the desired effect on the optical signals.

Figure 1A:
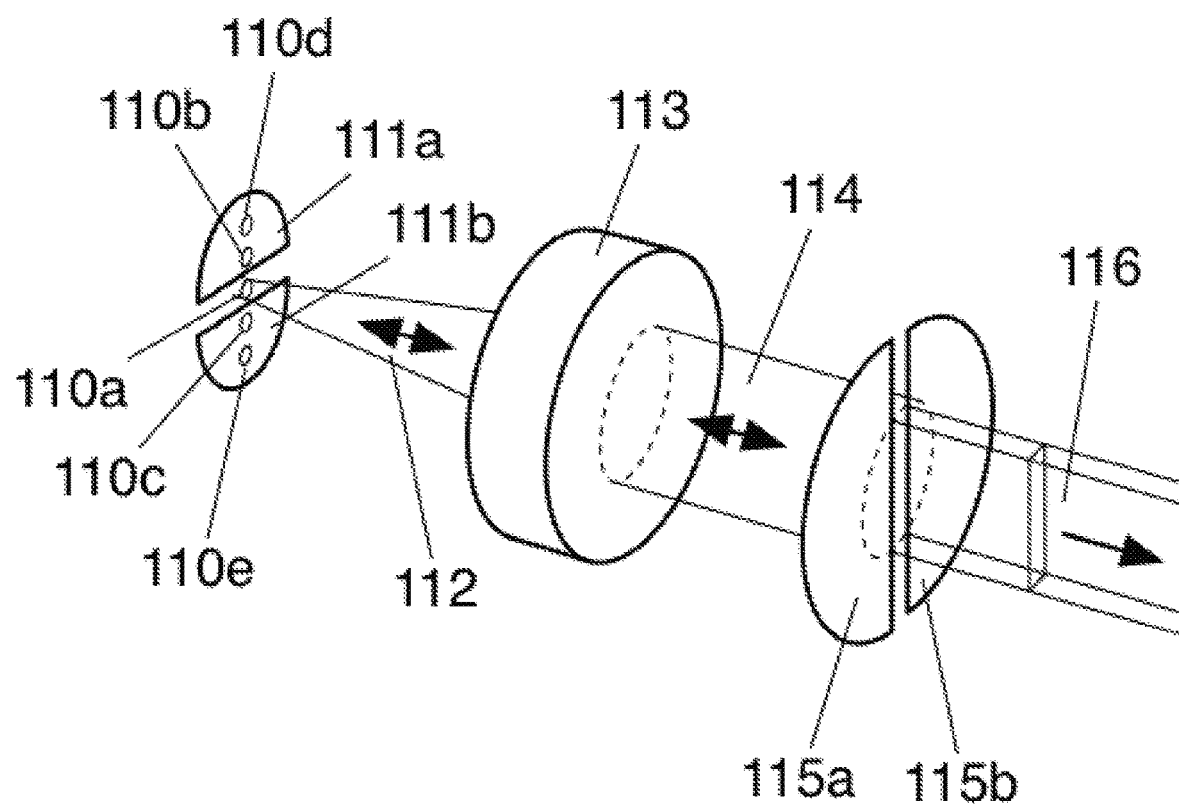
FIG. 1A shows an isometric view of an embodiment of a hybrid image-pupil optical reformatter.
Figure 1B:
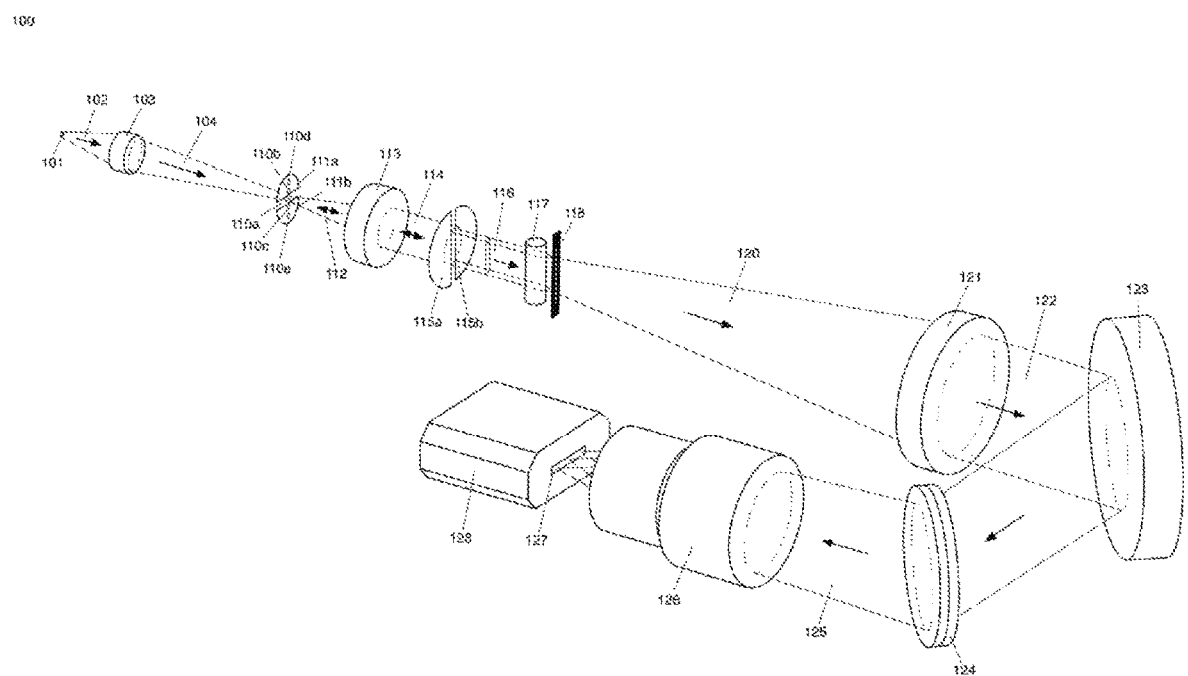
FIG. 1B shows an isometric view of the embodiment of the hybrid image-pupil optical reformatter of FIG. 1A in use with or as part of an optical spectrometer.

With reference to FIG. 1A, an embodiment of the hybrid image-pupil optical reformatter is shown. For reference, the hybrid image-pupil optical reformatter is depicted as part of a dispersive spectrometer system in FIG. 1B. The system of FIG. 1B may all be contained within a single physical enclosure, or may be split between several physical enclosures with appropriate optical coupling between them. Directions in FIGS. 1A and 1B are described herein as "horizontal" wherein the orientation is substantially parallel to the dispersion axis of the disperser and "vertical" wherein the orientation is substantially perpendicular to the dispersion axis of the disperser, although persons of skill will appreciate that the system can be configured with other orientations.

In the embodiment of FIG. 1A, light source 110a produces beam 112, shown as a diverging beam, which is collimated by collimating element 113 into a first substantially collimated beam 114. Light source 110a may be the output of an optical fiber, a bundle of multiple optical fibers, an image relay, a physical aperture, or some other source. Several types of optical elements could be used to form collimating element 113, including for example, a singlet lens, doublet lens, a complex lens, a single mirror or a complex mirror, or other optical element which collimates a diverging beam (and which focuses a collimated beam, based on the principle of optical reversibility).

In the embodiment shown, collimated beam 114 arrives at optical element 115, shown as comprising a pair of mirrors 115a and 115b which redirect portions of beam 114 by reflection. In other embodiments, optical element 115 may comprise other optical components to redirect portions of beam 114. These mirrors, also referred to as pupil mirrors because they operate on a collimated pupil beam, could be configured with straight edges incident on the beam profile and could for example be two vertical D-mirrors although persons of skill will appreciate that other optical elements and configurations of optical elements could be used. In the embodiment depicted mirrors 115a and 115b are flat and separated by a small gap such that a portion of collimated beam 114 passes between the gap, forming part of collimated output beam 116. Persons of skill will appreciate that the term "passes" or "pass" could refer to movement across, movement through, movement by, or other similar motion. Part of beam 114 reflects from mirror 115a and is redirected toward collimating element 113. Collimating element 113 converts the redirected collimated beam into a reimaging beam when the collimated beam passes back through it, which converges and comes to a focus near (ie. non-coincident with) image 110a. This focal point may lie upon optical element 111 which is shown as comprising a pair of reflective mirrors but may comprise other optical components to redirect a beam. This refocused image tends to be the same size as input source 110a and tends to have a lower light intensity. In the embodiment shown, mirror 115a is tilted vertically (i.e. the vertical axis is tilted around the horizontal axis) such that the reflected beam portion is not parallel to beam 114. This change to the angle at which the reflected beam portion passes through the collimator causes the refocused spot image 110b to be displaced vertically from image 110a, landing on flat mirror 111a which is located above image 110a. Similarly, another part of beam 114 reflects from mirror 115b, passes back through optical element 113, and comes to a focus near image 110a. However, mirror 115b is tilted such that the reflected and refocused spot image 110c is displaced vertically from image 110a in the opposite direction of image 110b, landing on flat mirror 111b which is located below image 110a. Mirrors 111 may also be referred to as image mirrors because they tend to operate on a focused image. These image mirrors could for example, be two horizontal D-mirrors although persons of skill will appreciate that other optical elements and configurations of optical elements could be used. In some embodiments, one of the image mirrors may be positioned in the source image focal plane just above the source image, while the other may be positioned in the source image focal plane just below the source image, such that the source image enters the slicer by passing between the image mirrors. In other embodiments the mirrors, or a single mirror, may be a one-way mirror placed in front of the input source such that it allows light to enter from the input source while still reflecting the reimaging beams.

Images 110b and 110c reflect from their respective mirrors back towards optical element 113, where they are recollimated into additional collimated beams similar to and substantially coincident with beam 114, but slightly tilted and laterally offset. In the embodiment shown, mirror 111a is tilted horizontally such that the redirected reimaging beam is directed toward collimator 113 at a different horizontal angle than diverging beam 112, such that the additional collimated beam produced is shifted toward the center of optical element 115, relative to the redirected collimated beam portion produced by mirror 115b. Similarly, mirror 111b is tilted horizontally such that the additional collimated beam produced from the redirected reimaging beam is shifted toward the center of optical element 115, relative to the redirected collimated beam portion produced by mirror 115a. These additional collimated beams encounter mirrors 115a and 115b, and a portion of each passes through the gap between the pupil mirrors and are added to output beam 116, while other portions are reflected back through optical element 113 to form spot images 110d and 110e on mirrors 111a and 111b. Depending on the spacing and angular tilt of mirrors 115a, 115b, 111a, and 111b, the number of multiple reflections and spot images 110 may be two, three, four, five, or any larger number, and the number of spot images, multiple reflections, and beam portions passing between the pupil mirrors may or may not be equal. In other embodiments, optical elements 115 and 111 may each comprise a single mirror and there may only be a single reflection from each and a single additional spot image produced. In some embodiments, preferred for some implementations, the beam portions remaining on the final reflection pass fully by mirrors 115a and 115b without any portions being reflected. In alternative embodiments, there may be reflections that result in optical element 115 reflecting all of the light and not allowing any of the light to form part of output beam 116 until reflected back again later. Also, in alternative embodiments optical element 111 may only redirect some of the reimaging beams or some portions of the reimaging beams and not all of the reimaging beams as shown.

Collimated beam 116 may therefore also comprise a plurality of substantially similar and spatially coincident beams or beam portions, each corresponding to one of the spot images 110, and together those beams and beam portions form the output beam of the optical reformatter. Each of the beam portions which form the output beam may have a tall narrow profile, similar in height to the first collimated beam and narrower in width, and each with a slightly different vertical tilt. The vertical tilt tends to create a slight vertical divergence in the output beam. In some embodiments, preferred for some implementations, reformatter output beam 116 comprises substantially all of the light intensity (light energy) contained in the input light, with only small losses due to the reflective or transmissive efficiency of the optical components in the reformatter. In some embodiments, an additional optical element may redirect output beam 116 in order to change the layout of the optical system or to couple more conveniently or efficiently with a downstream optical element.

Figure 2:
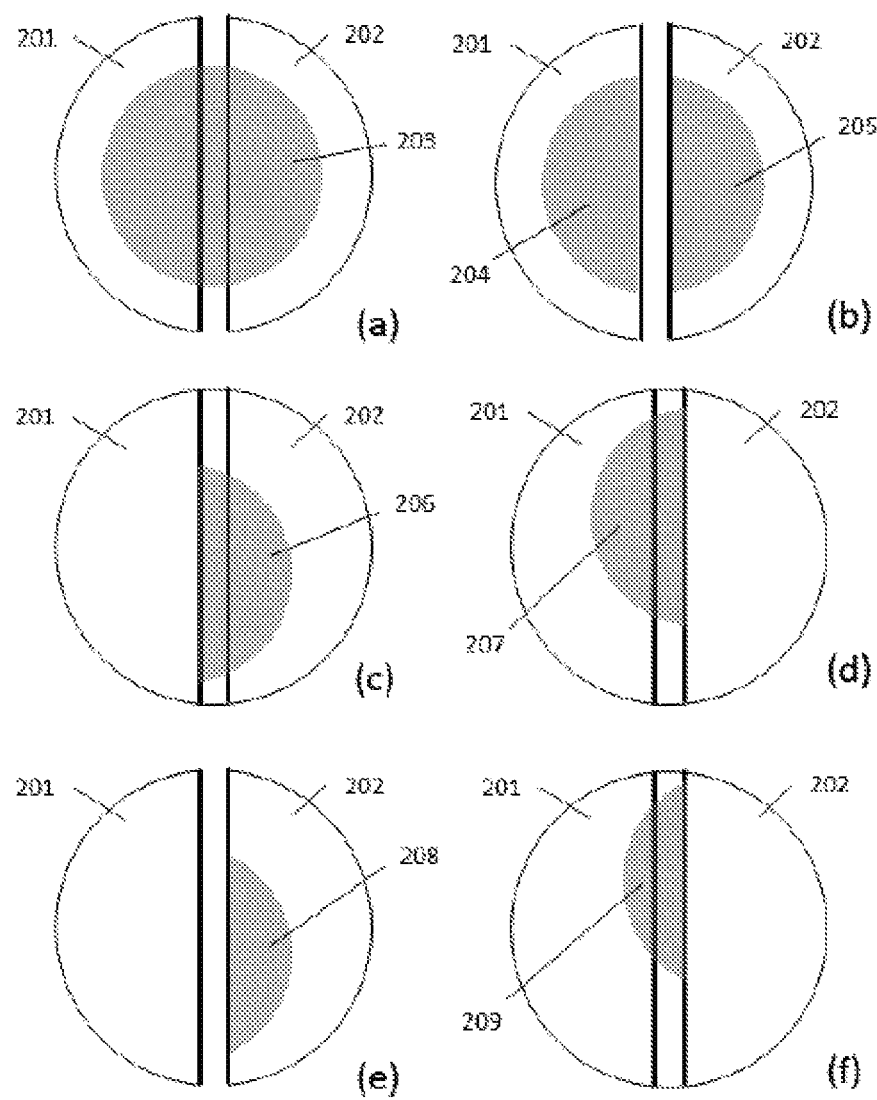
FIG. 2 illustrates the slicing and redirection of collimated beams in an embodiment of a hybrid image-pupil optical reformatter, shown as cross sections of the reformatter at the pupil mirrors.

FIG. 2 further illustrates the slicing and redirection of the collimated beams and additional beam portions, as shown at the pupil mirrors, in an embodiment of a hybrid image-pupil reformatter. FIG. 2a shows first collimated beam 203 being received by pupil mirrors 201 and 202, corresponding to mirrors 115a and 115b in FIG. 1. FIG. 2b shows the left (204) and right (205) portions of the beam being redirected back to the collimator (not shown) while the middle portion has passed through the gap between the pupil mirrors to form part of the output beam. FIG. 2c shows the additional collimated beam 206 produced from beam portion 204 after it has been reimaged, redirected by the corresponding image mirror (not shown), and recollimated by the collimator (not shown). Note that in the embodiment shown, beam 206 has been flipped and shifted toward the middle of the pupil mirrors 201 and 202, and shifted downwards relative to beam 204. A portion of beam 206 will pass through the gap between the pupil mirrors to also form part of the output beam, while the other portion of beam 206 will be reflected by mirror 202. Similarly, FIG. 2d shows additional collimated beam 207 produced from beam 205 after it has been reimaged, redirected by the corresponding image mirror (not shown), and recollimated by the collimator (not shown). Part of beam 207 will pass between pupil mirrors 201 and 202, joining the output beam, while the other portion of beam 207 will be reflected by mirror 201. FIG. 2e shows beam 208, the portion of beam 206 which is reflected by the pupil mirror while the remainder of beam 206 passes through the gap between the pupil mirrors. Finally, FIG. 2f shows beam 209 produced from beam portion 208 after reimaging and redirection by the image mirror (not shown) and recollimation by the collimator (not shown). This process may continue until all of the light has been shifted into the gap between the mirrors and passed through to form part of the output beam. It can be seen that in an embodiment preferred for some applications, the number of iterations will be equal to the width of the first collimated beam divided by the separation distance of the pupil mirrors.

Returning to FIG. 1B, an example embodiment is shown in which an optional image relay with one or more curved lenses or mirrors is used to reimage a light source such as a fiber output onto the reformatter light source focal plane 110a. This may be advantageous when using a fiber-fed source because with the image relay, the fiber cladding or jacketing or ferrule will tend not to interfere with the image mirrors, and the f-ratio within the slicer section can be altered from the f-ratio exiting the fiber, for instance to slow down the f-ratio to reduce aberrations in the collimating lens. In the image relay of FIG. 1B, input aperture 101 transmits a diverging beam 102 with a broadband spectral profile. Persons of skill will appreciate that input aperture 101 could be implemented for example, using an optical fiber, a pinhole, or a light source, however other input sources would also be suitable. Diverging beam 102 is refocused by optical element 103, which is depicted in the embodiment of FIG. 1B as a singlet lens. Optical element 103 could be implemented using numerous types of optical elements, for example a doublet achromat lens, a complex lens, a single concave mirror, or a complex mirror system. Optical element 103 focuses the beam into a converging beam 104 which forms an image 110a of input aperture 101.

FIG. 1B also shows how the output of the reformatter could be directed toward the input of a spectrometer, or how the reformatter could be directly incorporated into a spectrometer. Persons of skill will appreciate that there are several different ways to send the reformatter output beam into the dispersive spectrometer section of the system. In the embodiment shown, collimated reformatter output beam 116 passes through focusing element 117, which may be a rod lens, cylindrical lens, cylindrical mirror, or any other optical element which will tend to focus the beam portions along the horizontal axis and not along the vertical axis. In the embodiment shown, the light in the beam portions therefore tends to focused into a tall narrow slit-like image (relative to input aperture 101 which may have had a circular appearance) at intermediate focal plane 118. A physical slit or light baffle may be placed at focal plane 118 to restrict the light passing through, block scattered light, make the slit image even narrower (at the cost of reduced light intensity), or all of the horizontally focused light may be permitted to pass through this focal plane. A spectrometer could also be placed with its input aperture at focal plane 118.

Continuing the description of the hybrid image-pupil optical slicer being used as part of a dispersive spectrometer as shown in FIG. 1B, upon passing through focal plane 118, the plurality of beam portions forms beam 120, which tends to look like a diverging beam, for example f/5 vertically and f/5 horizontally. This diverging beam is collimated by optical element 121 to create collimated beam 122, which has been expanded in the dispersive direction relative to output beam 116. Expansion could also be implemented using an expander element to diverge and recollimate the beam, for example a convex lens and concave lens, or a convex mirror and concave mirror, instead of components 117 and 121 which cause the beam to converge through a focus before forming a diverging beam which is subsequently recollimated. This expansion of the pupil beam contributes to narrowing of the refocused image produced from that beam. Expanded collimated beam 122 reflects from flat fold mirror 123 to dispersion element 124, which may be a diffraction grating, prism, grism, or any other spectrally dispersive element. The disperser 124 creates a spectrally dispersed beam 125 comprising a plurality of monochromatic collimated beams, where the horizontal angle of each beam is dependent upon its wavelength. Focusing element 126, comprising for example, a simple or complex lens, or a simple or complex mirror, or combination thereof, focuses these dispersed beams on to focal plane detector 127 on detector system 128, which may be a CCD device, CMOS device, InGaAs sensor, linear photodiode array, photographic film, single-pixel photodiode or photomultiplier tube, or any other light-detecting apparatus. The measured intensities of each sensor element in detector system 128 provide a measurement of the spectral distribution of the original light beam passing through aperture 101. The optical sequence from focal plane 118 to detector system 128 is similar to many other dispersive spectrometer designs, however, unlike other dispersive spectrometer designs, the beam reformatting method of the hybrid image-pupil optical slicer implemented by elements 101 through 117, reshapes the input source 101 into a tall narrow image at focal plane 118 to provide higher spectral resolution without losing light at a narrow slit.

Persons of skill will appreciate that in some cases it may be advantageous to make use of a dispersive spectrometer with additional optical reformatting, a dispersive spectrometer with additional beam expansion and/or compression along one or more axes, or some other dispersive spectrometer design.

Figure 3:
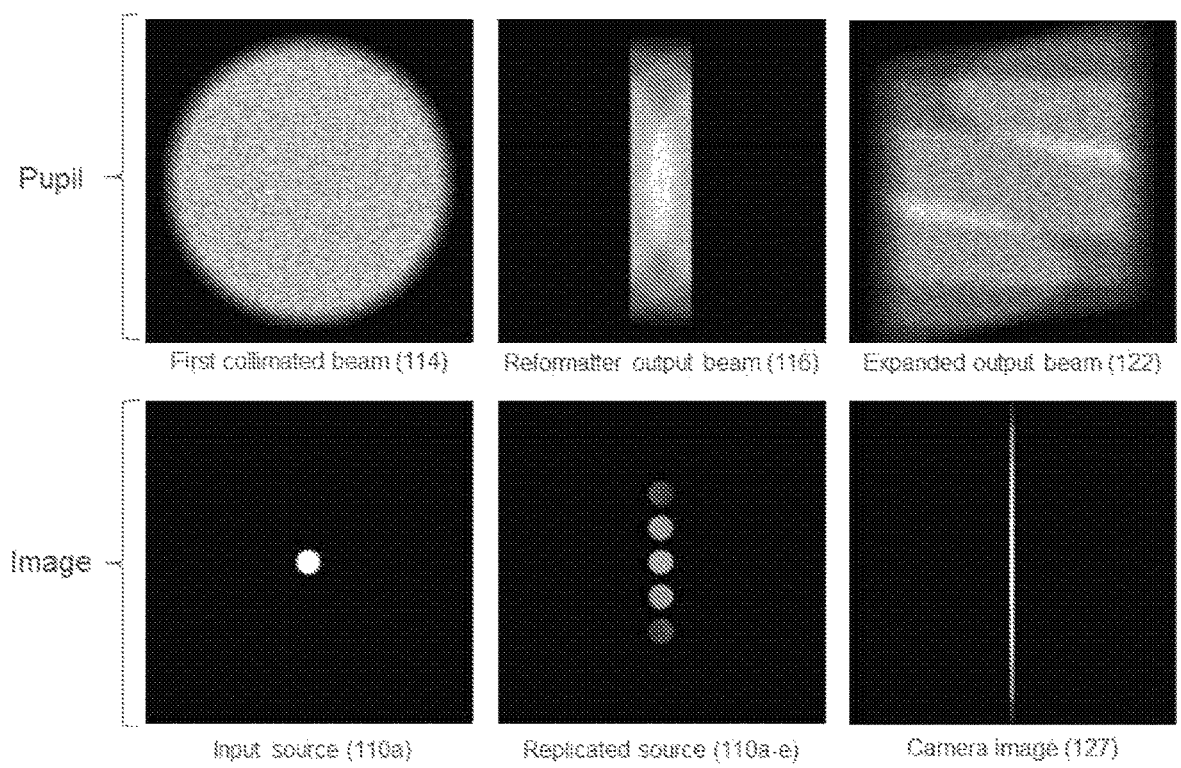
FIG. 3 shows the shapes of the pupil beams and focused images that may exist at various points in the operation of embodiments of a hybrid image-pupil optical reformatter such as shown in FIGS. 1A and 1B.

FIG. 3 illustrates the shapes of the pupil beams and focused images that may exist at various points in the embodiment of FIG. 1A and FIG. 1B. The first collimated pupil beam 114 is shown as a round beam with relatively uniform intensity. The reformatted output beam 116 is shown with a width corresponding to the gap between mirrors 115a and 115b, and with superimposed beam portions contributed by the first collimated beam and the additional collimated beams. Overlapping D-shaped portions of the additional collimated beams which pass optical element 115 combine such that some portions of the output beam have a greater light intensity than others. Expanded output beam 122 is also shown. FIG. 3 also shows input source image 110a, replicated sources 110a-e at the focus of collimating element 113 (which is also the source image focal plane and the position of mirrors 111), and the refocused camera image at the focal plane of the camera image (127). Note that the intensity of the replicated sources decreases with each pass between the first and second optical elements because additional beam portions pass optical element 115 to form part of the output beam on each pass, and less of the light is reflected back.

In some embodiments, there may be a different number of pupil mirrors (for example, 1 or 3 instead of a pair), a different number of image mirrors, or even unequal numbers of pupil and image mirrors. Some embodiments may also include only a single pupil slicing mirror and a single image mirror, which would tend to provide only two slices. In such an alternative, light would tend to pass around the image mirror rather than through a gap between the mirrors. Furthermore, in other embodiments the design may be configured such that not all portions of all the reflected pupil beams are later reflected back into the pupil by the image mirrors.

The design could tend to be described as a first pass design in instances where beams are only redirected between the pupil mirrors and image mirrors one time. As the number of passes increases (i.e. increased iterations) and the portion of the collimated beams which passes by the image mirrors to form part of the output beam on each pass decreases, the narrowing of the output beam relative to the first collimated beam can be larger which may be advantageous, for example by enabling the output beam to be expanded by a larger factor without becoming larger than the first collimated beam. In some systems the number of iterative passes could be quite large. However, as the number of passes increases, the light intensity will decrease due to reflective and transmissive losses. A compromise between these two factors will determine the most appropriate number of passes for a given implementation.

In the present invention, the collimated pupil beam tends to be sliced into separate sub-beams, like the traditional optical slicers, which tends to have no effect on the refocused spot, but the tilt in those slicing mirrors tends to shift the refocused spot images vertically, so the "stacking" is done in image space instead of in pupil space. As such, the different collimated slices are all superimposed on top of each other in pupil space instead of being stacked vertically. Each collimated slice will tend to have a different vertical angle, and the total bundle of slice beams will tend to have greater vertical divergence than any single beam. In practice, this vertical divergence is similar to the horizontal divergence exhibited after the input is passed through the slit, such that the downstream optics can be round or square instead of highly rectangular. The tall skinny pupil consisting of the superimposed slices can then be focused horizontally to make an intermediate virtual slit image which can be passed through a physical slit if desired (to reduce scattered light leakage) before going to a dispersive spectrometer backend. The horizontal focusing can be achieved using a cylindrical lens, to create a virtual slit image in which the original image spots are 'blurred' together into a single column of light. Persons of skill will appreciate that the focusing could also be done in other ways, such as using a spherical lens, although such a spherical lens may require an impractical f-ratio to implement.

It is also possible to direct the reformatted pupil beam in the present invention, without undergoing a horizontal focusing, to the input of a dispersive spectrometer specially designed to handle this type of input. There may also be applications in which the reformatted output in the present invention, either collimated or focused, could be used as the input to other optical devices aside from only dispersive spectrometers.

Persons of skill will appreciate that in some embodiments certain of the optical elements which are depicted in FIG. 1 could be replaced with alternative elements which provide similar functionality via a different method, or combine the functionality of two or more original elements. By way of example, the lens-based transmissive reimager (103) could be replaced with a catadioptric system or fully-reflective reimaging system. By way of further example, the collimator (113) could be implemented with an off-axis paraboloid mirror instead of a lens. By way of further example, the pupil mirrors (115a and 115b) could be replaced by a single mirror with a slit or hole cut into it. By way of yet further example, the collimator (113) and pupil mirrors (115a and 115b) could be combined into a single element consisting of a transmissive lens with one surface fabricated with different angles and partially coated with a reflective coating to act as a mirror or mirrors.

While the present invention can be used with any device that tends to use light as an input, as previously noted, one example of the use of the optical slicer described herein may be in the field of spectroscopy. A general spectrometer is a device that disperses light such that the intensity value of light as a function of wavelength can be recorded on a detector. For readings that require a higher spectral resolution, a narrower slit tends to be needed in a direct relationship to spectral resolution and typically, a narrow slit will provide a reduction in the light intensity received at the detector or sensor focal plane of the general spectrometer device. Positioning an optical slicer in front of the input of a general spectrometer device, possibly in combination with some form of implicit or explicit beam expansion, can tend to produce an input into the general spectrometer device slit having an increased light intensity value as compared to a slit without an optical slicer, by the factor of the slicing factor, over the area of the slit, tending to provide increased spectral resolution without sacrificing light signal intensity.

A subset of spectroscopy is interferometric spectroscopy; the defining feature of interferometric spectrometers is that the dispersing element used is not a grating or a prism. Rather, the dispersion is achieved another way, such as by taking the Fourier transform of the pattern generated by two interfering beams. The slicer not only increases brightness of the output, but also allows large improvements in the contrast of the interference fringes, as well as signal-to-noise ratio.

A further subset of interferometric spectrometry as pertains to medical imaging is Optical Coherence Tomography (OCT), a technique that uses an interferometric spectrometer to make an image. A slicer will improve the throughput, as well as the fringe contrast, of the OCT device; the result is that the slicer can improve the depth penetration possible with OCT systems, speeding imaging time and increasing the value of the captured image. An optical slicer can be included at the input to the OCT device.

An optical slicer can be used in a subset of OCT called Fourier domain OCT (FD-OCT), and more specifically in a specific implementation FD-OCT called Spectral Domain OCT (SD-OCT). An SD-OCT instrument is an interferometric spectrometer with a dispersive spectrometer to record the signal. An optical slicer can be included at the input to the dispersive spectrometer right before the dispersive beam element in a collimated beam path.

A further application of the slicer is in the field of miniature spectroscopy, particularly as it pertains to Raman spectroscopy. Current Raman spectrometers have been implemented that are miniaturized to handheld scale. As the slicer can be used to increase throughput in any system wherein light is used as the input source, a miniaturized embodiment of the slicer can be used in conjunction with miniaturized spectrometers, like the Raman spectrometer, to increase spectral resolution, increase output signal strength, and decrease scan time. An optical slicer can be included at the input to the Raman spectroscopy device.

The present invention has been described with regard to specific embodiments. However, it will be obvious to persons skilled in the art that a number of variants and modifications can be made without departing from the scope of the invention as described herein.

The invention claimed is:

1. A spectrometer comprising:
an optical reformatter for generating an output beam, comprising:
a collimator which receives an input light and produces a first collimated beam;
a first optical element which
(i) redirects one or more portions of the first collimated beam so they are received by the collimator which produces one or more reimaging beams; and
(ii) allows one or more portions of the first collimated beam to pass by the first optical element to form part of the output beam;
a second optical element which redirects one or more portions of the reimaging beams so they are received by the collimator which produces additional collimated beams;
wherein one or more portions of the additional collimated beams also form part of the output beam;
an optical element to expand the output beam along a first dimension to produce an expanded beam;
a dispersive element to spectrally disperse the expanded beam along the first dimension to produce a spectrally dispersed beam;
a focusing element to Focus the spectrally dispersed beam to produce a focused spectrum; and
a detector to receive and measure the focused spectrum.

2. A method of generating an output beam comprising:
collimating an input light using a collimator to produce a first collimated beam;
using an optical element to redirect one or more portions of the first collimated beam so they are received by the collimator which produces one or more reimaging beams;
using an optical element to redirect one or more of the reimaging beams so they are received by the collimator which produces additional collimated beams; and
forming an output beam from the additional collimated beams and portions of the first collimated beams which are not redirected so they are received by the collimator.

3. The method of claim 2 wherein portions of the additional collimated beams are also redirected so they are received by the collimator which produces additional reimaging beams, and one or more of the additional reimaging beams are redirected so they are received by the collimator which produces further collimated beams;
wherein the output beam includes portions of the further additional collimated beams.

4. The method of claim 3 wherein the redirection is iterative.

5. The method of claim 2 wherein the redirected beams and beam portions are redirected to produce an output beam formed from substantially overlapping beams and beam portions, propagating in substantially the same direction, and with substantially all of the light energy in the input light.

6. The method of claim 2 wherein the redirected beams and beam portions are redirected to produce an output beam that is narrower in a first dimension relative to the first collimated beam.

7. The method of claim 2 further comprising focusing the output beam onto the input of a spectrometer.

8. The method of claim 2 further comprising:
expanding the output beam along a first dimension to produce an expanded beam;
spectrally dispersing the expanded beam along the first dimension to produce a spectrally dispersed beam;
focusing the spectrally dispersed beam to produce a focused spectrum, and; measuring the focused spectrum.

* * * * *